(12) United States Patent
Forrest et al.

(10) Patent No.: US 11,039,568 B2
(45) Date of Patent: Jun. 22, 2021

(54) SYSTEM FOR LEVELING PARTICULATE MATERIAL

(71) Applicant: CNH INDUSTRIAL CANADA, LTD., Saskatoon (CA)

(72) Inventors: Jay Forrest, Saskatoon (CA); Benjamin McKnight, Aberdeen (CA); Jack Turner, Saskatoon (CA); Russell Louis Altman, Saskatoon (CA); Jared S. Wright, Saskatoon (CA)

(73) Assignee: CNH Industrial Canada, Ltd., Saskatoon (CA)

( * ) Notice: Subject to any disclaimer, the term of this patent is extended or adjusted under 35 U.S.C. 154(b) by 187 days.

(21) Appl. No.: 15/884,008

(22) Filed: Jan. 30, 2018

(65) Prior Publication Data
US 2019/0230847 A1     Aug. 1, 2019

(51) Int. Cl.
*A01C 7/10*     (2006.01)
*A01C 7/08*     (2006.01)
(Continued)

(52) U.S. Cl.
CPC .............. *A01C 7/102* (2013.01); *A01C 7/081* (2013.01); *A01C 7/084* (2013.01); *A01C 15/007* (2013.01);
(Continued)

(58) Field of Classification Search
CPC ....... A01C 15/007; A01C 7/102; A01C 15/16; A01C 7/16; B65D 88/68; B65G 65/46; B01F 3/184; B01F 7/00433; B01F 7/0065
See application file for complete search history.

(56) References Cited

U.S. PATENT DOCUMENTS 721,732 A  *  3/1903  Nance ...................... A01C 7/16
                                                          222/231
1,947,379 A     2/1934  Cargill
(Continued)

FOREIGN PATENT DOCUMENTS

GB          716743        10/1954
GB       2026447 A        2/1980
(Continued)

OTHER PUBLICATIONS

Alibaba.com; "Abilene Machine 320724A3 New Replacement Grain Delivery Leveling Auger with AFS for Case IH 1660 1666 1680 1688 2188 2388++ Combines"; https://guide.alibaba.com/shop/abilene-machine-320724a3-new-replacement-grain-delivery-leveling-auger-with-afs-for-case-h-1660-1666-1680-1688-2188-2388-combines_37019464.htm; retrieved on Aug. 16, 2017.
(Continued)

*Primary Examiner* — Elizabeth Insler
(74) *Attorney, Agent, or Firm* — Rebecca L. Henkel; Rickard K. DeMille

(57) ABSTRACT

A particulate material leveling system includes an agitating system disposed within a storage tank for a particulate material. The agitating system includes a drive system and a shaft coupled to the drive system. Further, the drive system drives the shaft to rotate about a central axis. The agitating system also includes a wrapped wire coupled to the shaft. The wrapped wire extends around the shaft along a helical path in an axial direction and a circumferential direction, and the wrapped wire moves the particulate material in the axial direction in response to rotation of the shaft in a first direction about the central axis.

20 Claims, 4 Drawing Sheets

(51) Int. Cl.
  *B65D 88/68* (2006.01)
  *B65G 53/40* (2006.01)
  *B01F 3/18* (2006.01)
  *B01F 7/00* (2006.01)
  *B01F 15/00* (2006.01)
  *A01C 15/00* (2006.01)

(52) U.S. Cl.
  CPC .......... *B01F 3/184* (2013.01); *B01F 7/00433* (2013.01); *B01F 15/00207* (2013.01); *B01F 15/00409* (2013.01); *B01F 15/00506* (2013.01); *B01F 15/00538* (2013.01); *B65D 88/68* (2013.01); *B65G 53/40* (2013.01); *A01C 15/005* (2013.01); *B01F 2215/0013* (2013.01); *B65G 2201/042* (2013.01)

(56) References Cited

U.S. PATENT DOCUMENTS

| | | | |
|---|---|---|---|
| 2,657,831 A | 11/1953 | Pierce | |
| 2,755,002 A | 7/1956 | Gustafson | |
| 2,814,421 A * | 11/1957 | Buhr | A01C 15/16 222/272 |
| 2,826,344 A | 3/1958 | Weber | |
| 3,129,828 A | 4/1964 | Lusk | |
| 3,180,525 A | 4/1965 | Fabian et al. | |
| 3,430,822 A | 3/1969 | Lienemann et al. | |
| 3,532,232 A | 10/1970 | Sukup | |
| 4,015,366 A | 4/1977 | Hall, III | |
| 4,033,466 A | 7/1977 | Easton | |
| 4,100,538 A | 7/1978 | Knepler | |
| 4,159,064 A | 6/1979 | Hood | |
| 4,428,535 A * | 1/1984 | Venetucci | B01F 7/088 241/186.5 |
| 4,969,583 A | 11/1990 | Torimitsu et al. | |
| 5,007,590 A | 4/1991 | Taylor | |
| 5,234,128 A | 8/1993 | Hill | |
| 5,524,796 A * | 6/1996 | Hyer | B65G 33/18 198/662 |
| 6,715,640 B2 | 4/2004 | Tapphorn et al. | |
| 7,640,876 B2 | 1/2010 | Memory | |
| 7,969,319 B2 | 6/2011 | Kowalchuk | |
| 8,931,425 B2 | 1/2015 | Friggstad | |
| 9,198,343 B2 | 12/2015 | Mariman et al. | |
| 9,366,389 B2 | 6/2016 | Stewart et al. | |
| 9,481,294 B2 | 11/2016 | Sauder et al. | |
| 2016/0150724 A1 | 6/2016 | Browning et al. | |
| 2016/0278277 A1 | 9/2016 | Valberg | |
| 2017/0135280 A1 | 5/2017 | Rosengren et al. | |

FOREIGN PATENT DOCUMENTS

| | | |
|---|---|---|
| WO | 2011053286 A1 | 5/2011 |
| WO | 2015023684 A2 | 2/2015 |

OTHER PUBLICATIONS

Dickey-john; "Hopper Level Sensor"; http://www.dickey-john.com/product/hopper-level-sensor"; Aug. 21, 2017.
Banner; "Measurement and Level Monitoring"; https://www.banner-engineering.com/us/en/solutions/measurement-and-level-monitoring.html#all; Aug. 21, 2017.
CNH;"1200 Series Advanced Seed Meter Planters"; CNH America LLC, 2005.
U.S. Appl. No. 15/884,056, filed Jan. 30, 2018, Jay Forrest.

* cited by examiner

SYSTEM FOR LEVELING PARTICULATE MATERIAL

BACKGROUND

The present disclosure relates generally to a system for leveling particulate material.

Generally, seeding implements (e.g., seeders) are towed behind a tractor or other work vehicle via a mounting bracket secured to a rigid frame of the implement. Seeding implements typically include multiple row units distributed across a width of the implement. Each row unit is configured to deposit seeds at a targeted depth beneath the soil surface of a field, thereby establishing rows of planted seeds. For example, each row unit typically includes a ground engaging tool or opener that forms a seeding path (e.g., trench) for seed deposition into the soil. A seed tube (e.g., coupled to the opener) is configured to deposit seeds and/or other particulate materials (e.g., fertilizer) into the trench. The opener/seed tube may be followed by closing discs that move displaced soil back into the trench and/or a packer wheel that packs the soil on top of the deposited seeds.

In certain configurations, an air cart is used to meter and deliver particulate material (e.g., seeds, fertilizer, etc.) to the row units of the seeding implement. The air cart generally includes a storage tank (e.g., a pressurized tank), an air source (e.g., a blower), and a metering system. The product is typically gravity fed from the storage tank to the metering system which distributes a volume of product into an air stream generated by the air source. The air stream carries the product to the row units via conduits extending between the air cart and the seeding implement. The metering system typically includes meter rollers that control the flow of product based on meter roller geometry and rotation rate. As the air cart travels through the field, the particulate material may become unevenly distributed throughout the storage tank (e.g., due to the storage tank shifting, uneven rotation rates of the meter rollers, uneven placement of the meter rollers, etc.). For example, a void may form above one meter roller, thereby stopping flow to the respective row unit(s).

BRIEF DESCRIPTION

In one embodiment, a particulate material leveling system includes an agitating system disposed within a storage tank for a particulate material. The agitating system includes a drive system and a shaft coupled to the drive system. Further, the drive system drives the shaft to rotate about a central axis. The agitating system also includes a wrapped wire coupled to the shaft. The wrapped wire extends around the shaft along a helical path in an axial direction and a circumferential direction, and the wrapped wire moves the particulate material in the axial direction in response to rotation of the shaft in a first direction about the central axis.

In another embodiment, a particulate material leveling system includes an agitating system disposed within a storage tank for a particulate material. The agitating system includes a drive system and a shaft coupled to the drive system. Further, the drive system drives the shaft to rotate about a central axis. The agitating system also includes multiple wrapped wires. The multiple wrapped wires extend around the shaft along a helical path in an axial direction and a circumferential direction. In addition, the multiple wrapped wires move the particulate material in the axial direction in response to rotation of the shaft in a first direction about the central axis.

In a further embodiment, a particulate material leveling system includes an agitating system disposed within a storage tank for a particulate material. The agitating system includes a drive system and a shaft coupled to the drive system. Further, the drive system drives the shaft to rotate about a central axis. The agitating system also includes multiple wrapped wires. The multiple wrapped wires extend around the shaft along a helical path in an axial direction and a circumferential direction. A first wrapped wire of the multiple wrapped wires moves the particulate material in a first axial direction along the shaft and in response to rotation of the first wrapped wire in a first rotational direction about the central axis. Moreover, a second wrapped wire of the multiple wrapped wires is configured to move the particulate material in a second axial direction, opposite the first axial direction, along the shaft and in response to rotation of the second wrapped wire in the first rotational direction about the central axis.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Figure 1:
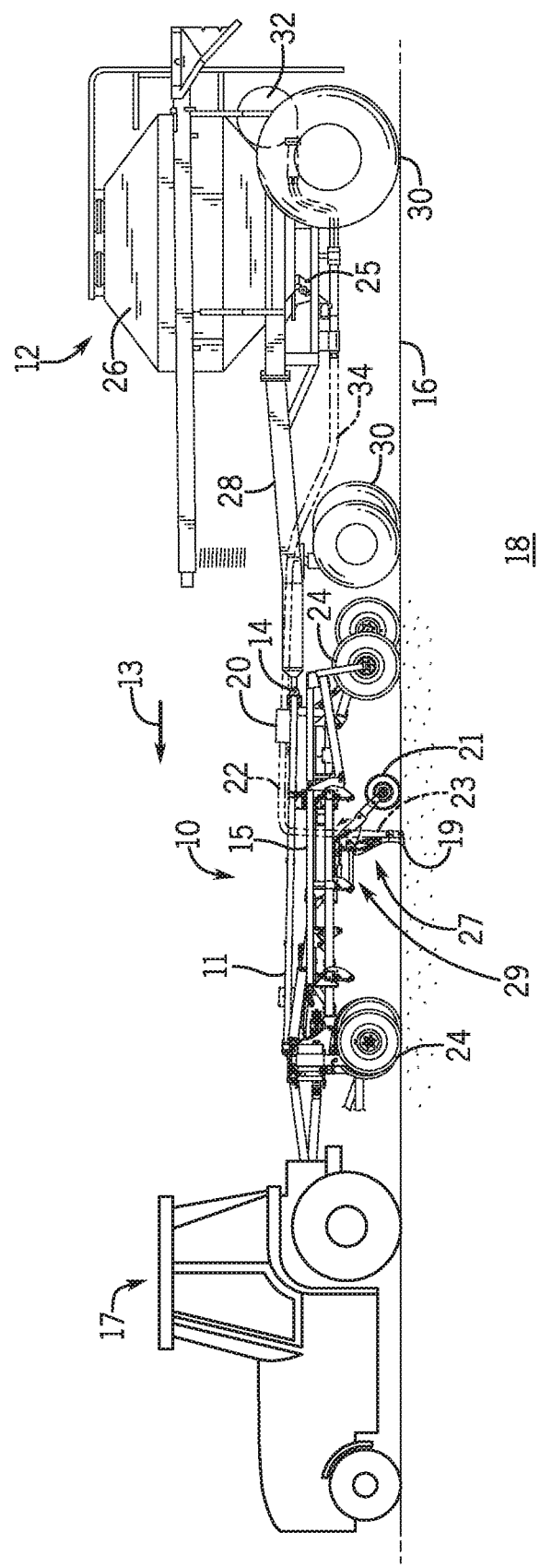
FIG. 1 is a side view of an embodiment of an agricultural product application system having an air cart, which includes a metering system configured to provide a flow of particulate material.

Turning now to the drawings, FIG. 1 is a side view of an embodiment of a particulate material application system 10. As depicted, the particulate material application system 10 (e.g., a seeding system or a planter system) includes an agricultural implement 11 coupled to an air cart 12. In the depicted embodiment, the air cart 12 is towed behind the agricultural implement 11, relative to a direction of travel 13. In addition, the agricultural implement 11 is coupled to a work vehicle 17 by a first hitch system, and the air cart 12 is coupled to the agricultural implement 11 by a second hitch system 14. While the agricultural implement 11 is towed between the work vehicle 17 and the air cart 12 in the illustrated embodiment, in other embodiments, the agricultural implement may be towed behind the air cart. In further embodiments, the implement and the air cart may be part of a single unit that is towed behind the work vehicle, or the agricultural implement and the air cart may be elements of a self-propelled vehicle.

The agricultural implement 11 may deposit rows of seeds or other particulate material into the soil as the agricultural implement 11 is towed across a surface 16 of an agricultural field 18 by the work vehicle 17. The agricultural implement 11 includes a tool frame 15 coupled to a row unit 27 (e.g., a ground engaging opener system), a distribution header 20, a hose 22, and wheel assemblies 24. The wheel assemblies 24 may contact the surface 16 to enable the agricultural implement 11 to be towed by the work vehicle 17. As the agricultural implement 11 moves in the direction of travel 13, a row of seeds/particulate material may be deposited into the soil by the row unit 27. Although only one row unit 27 is shown, the agricultural implement 11 may include multiple row units 27 organized in a row across a width of the agricultural implement 11. In some embodiments, the agricultural implement 11 may include a row of 12, 14, 16, 18, 20, or more row units 27, which may each deposit a respective row of seeds/particulate material.

To facilitate depositing seeds, each row unit 27 includes an opener 19, a press wheel 21, a seed tube 23, and a hydraulic cylinder 29. When the opener 19 engages the soil, the opener 19 may exert a force that excavates a trench into the soil as the row unit 27 travels through the field. In the present embodiment, a vertical position of the press wheel 21 controls the depth of the opener 19, and the hydraulic cylinder 29 controls the downward force (e.g., a down pressure) applied by the press wheel. In addition, the opener 19 may be controlled to establish a target depth of the trench. Seeds/particulate material may then be deposited into the excavated trench via the seed tube 23. Then, the press wheel 21 may facilitate movement of the excavated soil into the trench to cover the seeds and compress the soil covering the seeds.

The air cart 12 may centrally store particulate material and distribute the seeds to the row unit 27. Accordingly, the air cart 12 includes a particulate material meter 25, a storage tank 26, a frame 28, wheels 30, and an air source 32. In the depicted embodiment, the air cart frame 28 is coupled to the tool frame 15 via the hitch 14. The wheels 30 may contact the surface 16 to enable the air cart 12 to be towed along with the agricultural implement 11. Additionally, the storage tank 26 may centrally store the particulate material for distribution. In some embodiments, the storage tank 26 may include multiple compartments for storing different types of granular products/particulate material. For example, a first compartment may store seeds while a second compartment may store a dry fertilizer. In such configurations, the air cart 12 may deliver both seed and fertilizer to the agricultural implement 11 via separate distribution systems, or as a mixture through a single distribution system.

Generally, the distribution system may control the amount of seeds/particulate material distributed to the agricultural field 18 using the particulate material meter 25. For example, the particulate material meter 25 may be controlled to increase or decrease the amount of seeds/particulate material distributed to the agricultural field 18. As depicted, the particulate material meter 25 is mounted to the bottom of the storage tank 26, which may enable the storage tank 26 to supply seeds/particulate material to the particulate material meter 25. The particulate material meter 25 may then distribute the seeds/particulate material to the distribution header 20 via a respective hose 34. The distribution header 20 may then distribute the seeds to one or more row units 27 via the hose(s) 22. Some embodiments may include multiple headers 20, with one or more row units 27 coupled to each header 20 by a respective hose 22. In this manner, the particulate material meter 25 may control distribution of seeds/particulate material from the storage tank 26 to the row units 27 and into the trenches.

Figure 2:
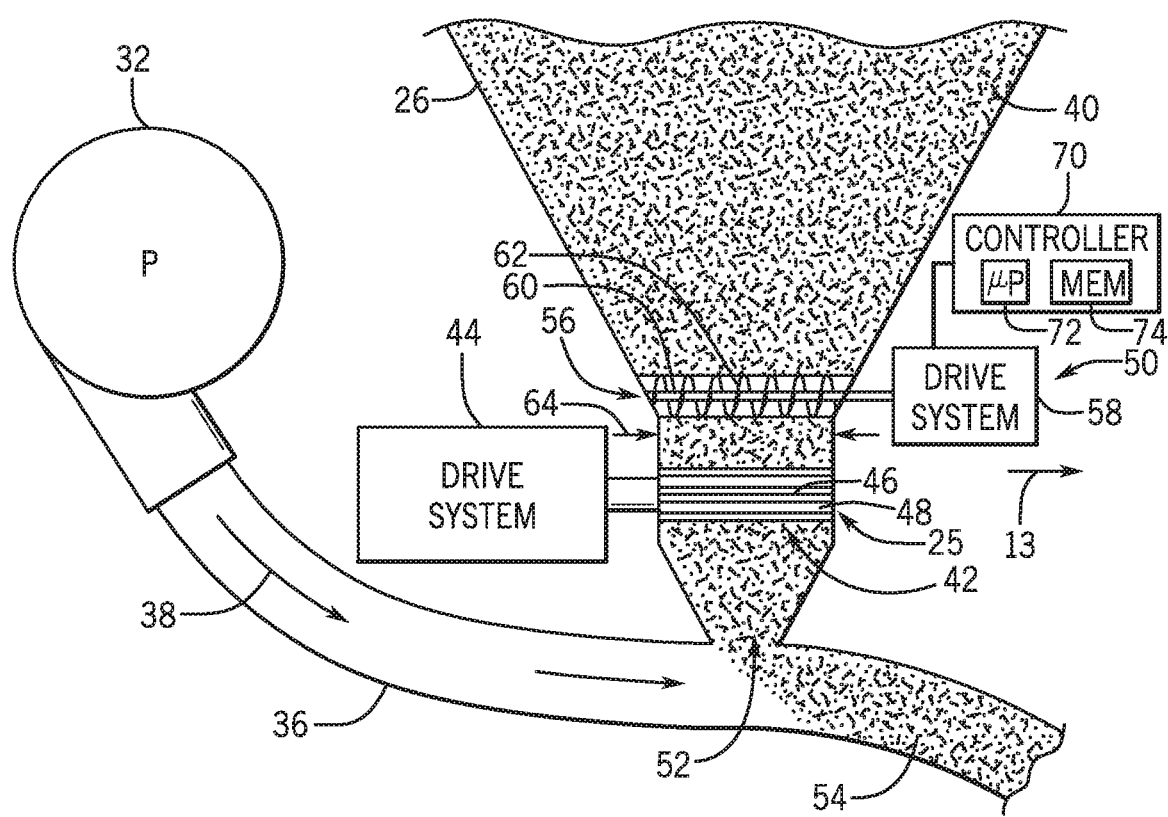
FIG. 2 is a schematic view of an embodiment of an agricultural product meter that may be employed within the air cart of FIG. 1.

FIG. 2 is a schematic view of an embodiment of a particulate material meter 25 that may be employed within the air cart 12 of FIG. 1. As illustrated, the air source 32 is coupled to a conduit 36 configured to provide an air stream 38 past the particulate material meter 25. The air source 32 may be a pump or blower powered by an electric or hydraulic motor, for example. Flowable particulate material 40 (e.g., seeds, fertilizer, etc.) within the storage tank 26 flows by gravity through a product leveler system 50 into the particulate material meter 25. In certain embodiments, the storage tank 26 is pressurized such that a static pressure in the storage tank 26 is greater than a static pressure in the conduit 36, thereby facilitating an even flow of product through the particulate material meter 25. The particulate material meter 25 includes one or more meter rollers 42 (e.g., rotatable metering devices) configured to regulate the flow of particulate material 40 into the air stream 38. For example, certain particulate material meters 25 may include twelve meter rollers 42, each may be disposed within an independent housing and each configured to flow particulate product into a respective conduit 36 for distribution to one or more respective row units of the agricultural implement. Such metering systems are known as "12-run" metering systems. However, in alternative embodiments, the particulate material meter 25 may include more or fewer meter rollers, e.g., 1, 2, 3, 4, 5, 6, 7, 8, 9, 10, 11, 13, or more.

In the illustrated embodiment, the meter roller 42 is coupled to a drive system 44 configured to drive the meter roller 42 to rotate. In certain embodiments, the drive system 44 may include a drive unit, such as an electric or hydraulic motor, configured to drive one or more meter rollers to rotate. In further embodiments, the drive system 44 may be coupled to a wheel (e.g., via a gear system) such that rotation of the wheel drives the meter roller 42 to rotate. Such a configuration automatically varies the rotation rate of the meter roller 42 based on the speed of the air cart.

In the illustrated embodiment, the meter roller 42 is oriented substantially parallel to the direction of travel 13 of the air cart. As used herein, substantially parallel may refer to an angle of about 0 to 45 degrees, about 0 to 30 degrees, about 0 to 15 degrees, about 0 to 5 degrees, or about 0 to 1 degree relative to an axis/direction (e.g., the direction of travel 13). By way of example, substantially parallel may refer to an angle less than 5 degrees, less than 4 degrees, less than 3 degrees, less than 2 degrees, less than 1 degree, or less than 0.5 degrees relative to an axis/direction. In further embodiments, the meter roller may be oriented substantially perpendicular to the direction of travel, or at any other suitable angle.

For a particular meter roller configuration, the rotation rate of the meter roller 42 controls the flow of particulate material 40 into the air stream 38. For example, as the meter roller 42 rotates, the meter roller transfers product through an opening 52 in the particulate material meter 25 into the respective conduit 36 (e.g., into a conduit associated with a respective row unit or group of row units). The product then mixes with air from the air source 32, thereby forming an air/product mixture 54. The mixture then flows to the respective row unit(s) of the implement via pneumatic conduits, where the seeds and/or fertilizer are deposited within the soil.

Before entering into the particulate material meter 25, the product flows through the product leveler system 50, which includes an agitating system 56 driven by a drive system 58. As the particulate material 40 rests in the storage tank 26, the particulate material 40 may clump together to form pieces larger than desired. As such, when the particulate material 40 flows through the agitating system 56, the clumps of particulate material 40 break into smaller pieces more suitable for flowing through the product meter 25. The agitating system 56 includes a shaft 60 coupled to the drive system 58 and a wrapped wire 62 coupled to the shaft 60. The wrapped wire 62 is wrapped around the shaft (e.g., in a cylindrical form, conical form, helical form, etc.) and enables the particulate material 40 to flow between the shaft 60 and the wrapped wire 62. During operation, clumps of the particulate material 40 that are bigger than the space between the shaft 60 and the wrapped wire 62 are broken up before entering the particulate material meter 25.

Further, the particulate material 40 may be unevenly distributed (e.g., there may be more particulate material 40 over certain meter rollers) in the storage tank. In some embodiments, the agitating system 56 may extend over multiple meter rollers 42. Further, each meter roller 42 may be individually controlled such that different flow rates of particulate material 40 are provided to respective row units/ groups of row units. As such, the particulate material 40 may become unevenly distributed as the particulate material meter 25 operates. Further, in some embodiments, the air cart may travel over uneven terrain, causing the particulate material 40 to shift due to external forces, leading to uneven distribution of the particulate material 40 in the storage tank 26. As such, the agitating system 56 may be utilized to move product along a length 64 of the agitating system 56 to produce a more even distribution of the particulate material 40 across the meter rollers 42.

In some embodiments, the product leveler system 50 also includes a controller 70 that may be located on the air cart 12. As illustrated, the controller 70 is communicatively coupled to the drive system 58. The controller 70 is configured to control the drive system 58 to adjust the particulate material 40, such as by altering the speed and/or direction of rotation of the drive system 58. For example, the drive system 58 may include an electric motor. In additional or alternative embodiments, the drive system may be operated manually, such as by an operator, without the use of the controller. In certain embodiments, the controller 70 may also be coupled to sensor(s) that output signal(s) indicative of a profile of the particulate material 40 within the storage tank 26. For example, if the controller 70 determines that a variation between the measured profile and a target profile of the particulate material 40 is below a threshold value, the controller 70 may control the drive system 58 to not rotate the agitating system 56. In some embodiments, upon determining that the variation between the measured profile and the target profile of the particulate material 40 is less than the threshold value, the controller 70 may control the drive system 58 to rotate the agitating system 56 (e.g., rotate the agitating system in alternate directions after a suitable number of rotations in one direction (e.g., 1, 2, 3, 4, 5 or more rotations)). If the controller 70 determined that the variation between the measured profile and the target profile of the particulate material 40 is greater than the threshold value, the controller 70 may control the drive system 58 to rotate the agitating system in a certain direction continuously until the controller 70 determines that the variation between the measured profile and the target profile of the particulate material 40 is less than the threshold value.

In the illustrated embodiment, the controller 70 includes a processor 72, such as a microprocessor, and a memory device 74. The controller 70 may also include one or more storage devices and/or other suitable components. The processor 72 may be used to execute software, such as software for controlling the drive system 58. Moreover, the processor 72 may include multiple microprocessors, one or more "general-purpose" microprocessors, one or more special-purpose microprocessors, and/or one or more application specific integrated circuits (ASICS), or some combination thereof. For example, the processor 72 may include one or more reduced instruction set (RISC) or complex instruction set (CISC) processors.

The memory device 74 may include a volatile memory, such as random access memory (RAM), and/or a nonvolatile memory, such as read-only memory (ROM). The memory device 74 may store a variety of information and may be used for various purposes. For example, the memory device 74 may store processor-executable instructions (e.g., firmware or software) for the processor 72 to execute, such as instructions for controlling the drive system 58. The storage device(s) (e.g., nonvolatile storage) may include ROM, flash memory, a hard drive, or any other suitable optical, magnetic, or solid-state storage medium, or a combination thereof. The storage device(s) may store data (e.g., the target profile of particulate material 40, number of rotations to turn before alternating direction of rotation, or the like), instructions (e.g., software or firmware for controlling the drive system 58), and any other suitable data. The processor 72 and/or memory device 74, or an additional processor and/or memory device, may be located in any suitable portion of the system. For example, a memory device storing instructions (e.g., software or firmware for controlling portions of the drive system 58) may be located in or associated with the drive system 58.

Figure 3:
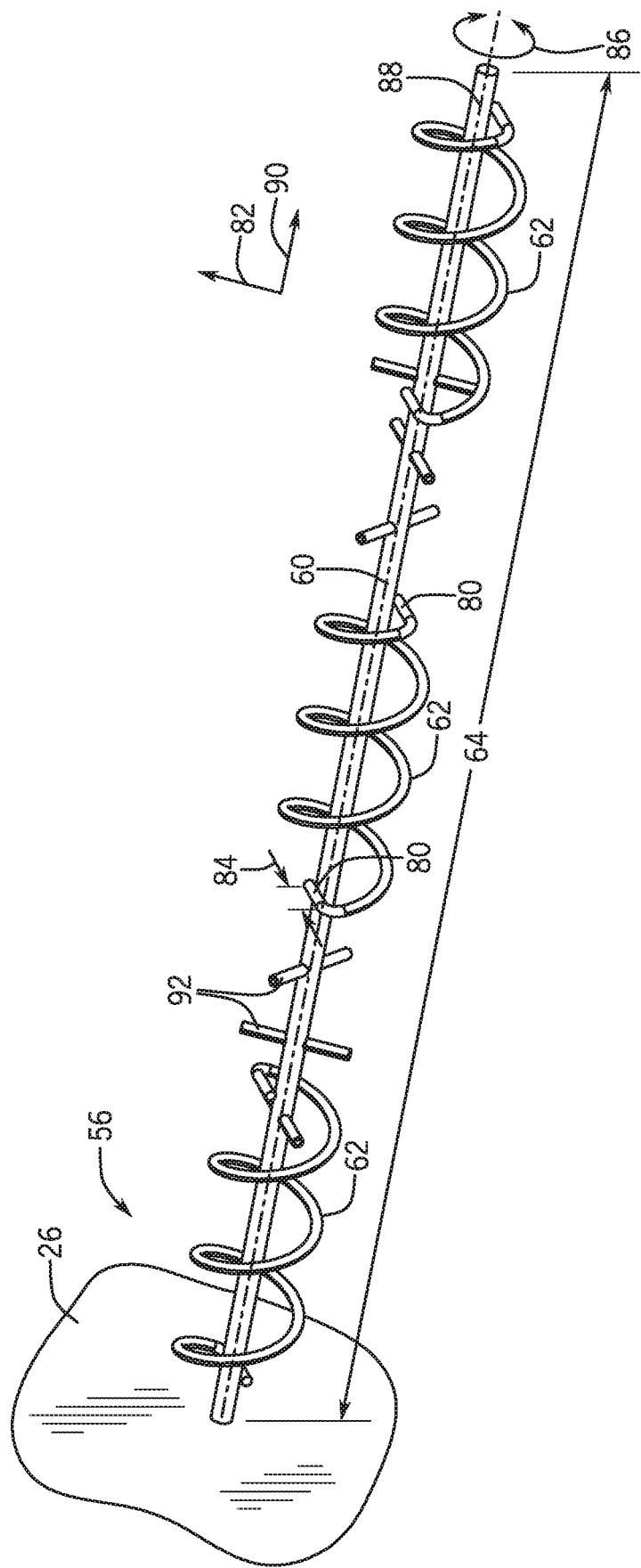
FIG. 3 is a perspective view of an embodiment of an agitating system that may be employed within the metering system of FIG. 2.

FIG. 3 is a perspective view of an embodiment of an agitating system 56 that may be employed within the metering system of FIG. 2. The agitating system 56 includes the shaft 60, the wrapped wires 62, mounting members 80, and agitating members 92. In the present embodiment, the wrapped wires 62 include multiple wires wrapped around the shaft 60. In some embodiments, the wrapped wires 62 may include one or more wires (e.g., 1, 2, 4, 5, 6, or more pieces) wrapped around the shaft 60. Further, in some embodiments, the wrapped wires 62 may be wrapped in multiple forms (e.g., in a cylindrical form, conical form, helical form, etc.) about the shaft 60. Further, the wrapped wires 62 are wrapped in a helical path around the shaft 60.

In the present embodiment, each wrapped wire 62 is rigidly coupled to the shaft 60 via mounting members 80 that extend in a radial direction 82 from the shaft 60 to the twisted portion of the wrapped wire 62. The agitating system 56 may include any suitable number of mounting members 80 per wrapped wire 62, including 1, 2, 3, 4, 5, 6, or more. Further, in some embodiments, the mounting members may extend from the shaft in a direction crosswise to the radial direction. For example, at least one mounting member may extend along an axis 10 degrees, 15 degrees, 20 degrees, 30 degrees, 45 degrees, 60 degrees, 80 degrees, or more relative to the radial direction 82. Further, in the present embodiment, the mounting members 80 are integrally formed at ends of the wrapped wires 62. In some embodiments, the mounting members may be integrally formed at non-end portions of the wrapped wires 62. Further, in some embodiments, the mounting members may be non-integral to the wrapped wires (e.g., integral with the shaft) and may be coupled to the wrapped wires (e.g., by welds, fasteners, etc.).

The twisted portion of each wrapped wire 62 is separated from the shaft 60 by a length 84 (e.g., extent along the radial axis 82). The length 84 establishes a gap that enables particulate material 40 to travel between the shaft 60 and the wrapped wire 62. The length 84 may be any suitable length, such as 1 centimeter, 1.5 centimeters, 2 centimeters, 2.5 centimeters, 3 centimeters, 3.5 centimeters, 4 centimeters, or more centimeters. In the present embodiment, the lengths 84 are substantially equal. In some embodiments, the lengths may vary (e.g., based on the lengths of the mounting members 80). For example, the length of one mounting member 80 may be greater than a length of another mounting member 80 to establish different lengths 84. In some embodiments, one wrapped wire may include mounting members having a first length, and another wrapped wire may include mounting members have a second length. In the present embodiment, the agitating system 56 includes three wrapped wires 62. Some embodiments may include any suitable number of wrapped wires, including 1, 2, 4, 5, 6, or more. Further, in some embodiments, the wrapped wires 62 may be coupled to the shaft at different lengths 84.

As the shaft 60 rotates in a circumferential direction 86 about a shaft axis 88, the wrapped wires 62 also rotate. While rotating, the ability of the agitating system 56 to break clumps of particulate material 40 is improved, which enables the meter rollers to accurately meter the particulate material 40, which produces a more homogenous size of particulate material 40, which improves yield. While the measure profile of the particulate material 40 is below a threshold value, the agitating system 56 may rotate a portion of one turn (e.g., one quarter, one third, one half, etc.) before changing the direction of rotation, which may maintain the profile of the particulate material 40. While the measured profile of the particulate material 40 is above a threshold value, the agitating system 56 may rotate continuously in one direction of rotation until the measured profile of the particulate material 40 is below the threshold value. The wrapped wires 62 turning continuously in one direction may cause the particulate material 40 to move in an axial direction 90 along the length 64 of the shaft from one portion of the storage tank 26 to another portion of the storage tank 26. In some embodiments, multiple wrapped wires may be included, and the multiple wrapped wires may be twisted in opposing directions. For example, some embodiments may include a first wrapped wire that extends along a portion of the length of the shaft and has a twist that causes the product to move in a first axial direction in response to continuous rotation of the first wrapped wire. These embodiments may also include a second wrapped wire that extends along a different portion of the length of the shaft and has a twist that causes the product to move in a second axial direction in response to continuous rotation of the second wrapped wire.

In the present embodiment, the shaft 60, the wrapped wires 62, and the mounting members 80 have round cross-sections (e.g., circular, ovular, etc.) to enhance flow of the particulate material 40. In some embodiments, the shaft, the wrapped wires, and the mounting members may have any suitable non-round shape cross-sectional, including triangular, quadrilateral, etc. Further, in some embodiments, the wrapped wires may be replaced by paddles extending in the radial direction from the shaft. Further, the shaft 60, the wrapped wires 62, and the mounting members 80 may be composed of any suitable material, including metal, plastic, ceramic, etc.

The agitating members 92 are also coupled to the shaft 60, and the agitating members 92 are provided to agitate the particulate material to provide a more homogenous mixture of the particulate material. In the present embodiment, the agitating members 92 are disposed axially between each of the wrapped wires 62. In some embodiments, the agitating members 92 may be disposed axially between only some of the wrapped wires 62, radially between the shaft 60 and the wrapped wires 62, or any other suitable location. Further, the agitating members 92 may be integrally formed with the shaft 60, coupled to the shaft 60 (e.g., by welds, fasteners, etc.), mounted in holes within the shaft 60, etc. In the some embodiments, any suitable number of agitating members may be included, such as 1, 2, 3, 4, 5, 6, or more. Further, in the present embodiment, the agitating members 92 are orthogonal to the shaft 60. In some embodiments, the agitating members may be disposed at any suitable angle relative to the shaft 60, including 10 degrees, 20 degrees, 30 degrees, 40 degrees, 50 degrees, 60 degrees, 70 degrees, 80 degrees, etc. In the present embodiment, the agitating members 92 have round cross-sections (e.g., circular, ovular, etc.). In some embodiments, the agitating members may have any suitable non-round shape cross-sectional, including triangular, quadrilateral, etc.

Figure 4:
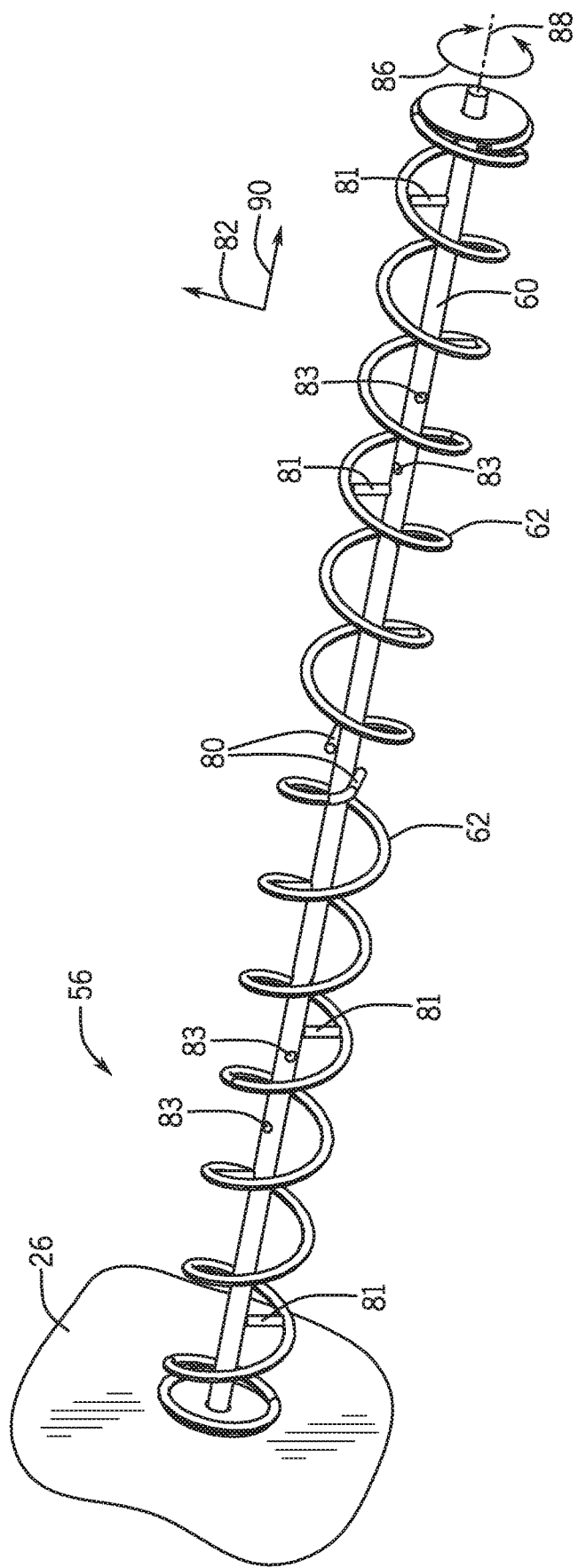
FIG. 4 is a perspective view of an embodiment of an agitating system that may be employed within the metering system of FIG. 2.

FIG. 4 is a perspective view of an embodiment of an agitating system 56 that may be employed within the metering system of FIG. 2. The agitating system 56 includes the shaft 60, wrapped wires 62, mounting members 80, intermediary mounting members 81, and slots 83.

In the present embodiment, each wrapped wire 62 is rigidly coupled to the shaft 60 via mounting members 80 that extend in a radial direction 82 from the shaft 60 to the twisted portion of the wrapped wire 62. The agitating system 56 may include any suitable number of mounting members 80 per wrapped wire 62, including 1, 2, 3, 4, 5, 6, or more. Further, in some embodiments, the mounting members may extend from the shaft in a direction crosswise to the radial direction. In the illustrated embodiment, each mounting member 80 extends linearly across an entire width of the shaft 60 in a crosswise direction relative to the shaft axis 88. For example, at least one mounting member may extend along an axis 10 degrees, 15 degrees, 20 degrees, 30 degrees, 45 degrees, 60 degrees, 80 degrees, or more relative to the radial direction 82. Further, the mounting members 80 are integrally formed at ends of the wrapped wires 62, and the intermediary mounting members 81 are integrally formed along a central portion of the wrapped wires 62. In some embodiments, the mounting members may be integrally formed at non-end portions of the wrapped wires 62. Further, in some embodiments, the mounting members may be non-integral to the wrapped wires (e.g., integral with the shaft) and may be coupled to the wrapped wires (e.g., by welds, fasteners, etc.).

The shaft 60 also includes a number of slots 83 that are recesses formed into the shaft 60. The slots may be utilized to couple agitating members to the shaft 60 to provide additional agitation to the particulate material. For example, certain particulate materials and/or climates may benefit from increased agitation, while other particulate materials and/or climates may benefit from less agitation. Accordingly, the slots 83 may provide increased flexibility by enabling the agitating system 56 to provide varying amounts of agitation.

While only certain features of the disclosure have been illustrated and described herein, many modifications and changes will occur to those skilled in the art. It is, therefore, to be understood that the appended claims are intended to cover all such modifications and changes as fall within the true spirit of the disclosure.

The invention claimed is:

1. A particulate material leveling system for an agricultural system comprising a storage tank for a particulate material, multiple meter rollers, multiple row units, each meter roller configured to distribute the particulate material to at least one row unit, the particular material leveling system comprising:
  an agitating system disposed within the storage tank and upstream of the multiple meter rollers, the agitating system comprising:
    a drive system;
    a shaft coupled to the drive system, wherein the drive system is configured to drive the shaft to rotate about a central axis;
    a wrapped wire, wherein the wrapped wire extends around the shaft along a helical path in an axial direction and a circumferential direction, and the wrapped wire is configured to move the particulate material in the axial direction in response to rotation of the shaft in a first direction about the central axis; and
    a controller communicatively coupled to the drive system, and configured to control the drive system to rotate the shaft to provide an even distribution of the particulate material across all of the multiple meter rollers.

2. The particulate material leveling system of claim 1, wherein the drive system is configured to be manually operated.

3. The particulate material leveling system of claim 1, wherein the drive system comprises an electric motor.

4. The particulate material leveling system of claim 3, wherein the controller is configured to control the electric motor to rotate the shaft a number of turns in the first direction about the central axis in response to determining that a variation between a measured profile of the particulate material and a target profile of the particulate material exceeds a threshold value.

5. The particulate material leveling system of claim 3, wherein the controller is configured to control the electric motor to rotate the shaft in alternating directions about the central axis in response to determining that a variation between a measured profile of the particulate material and a target profile of the particulate material is below a threshold value.

6. The particulate material leveling system of claim 1, wherein the agitating system comprises a plurality of agitating members coupled to the shaft.

7. The particulate material leveling system of claim 1, comprising at least one mounting member configured to couple the wrapped wire to the shaft, wherein the at least one mounting member is formed at an end of the wrapped wire.

8. A particulate material leveling system comprising:
  an agitating system configured to be disposed within a storage tank for a particulate material, wherein the agitating system is configured to direct the particulate material to multiple meter rollers, each meter roller configured to meter the particulate material to at least one row unit of an agricultural system, and wherein the agitating system comprising:
    a drive system;
    a shaft coupled to the drive system, wherein the drive system is configured to drive the shaft to rotate about a central axis;
    a plurality of wrapped wires, wherein the plurality of wrapped wires extend around the shaft along a helical path in an axial direction and a circumferential direction, and the plurality of wrapped wires is configured to move the particulate material in the axial direction in response to rotation of the shaft in a first direction about the central axis; and
    a controller communicatively coupled to the drive system, and configured to control the drive system to rotate the shaft to provide an even distribution of the particulate material across all of the multiple meter rollers.

9. The particulate material leveling system of claim 8, wherein the drive system is configured to be manually operated.

10. The particulate material leveling system of claim 8, wherein the drive system comprises an electric motor.

11. The particulate material leveling system of claim 10, wherein the controller is configured to control the electric motor to rotate the shaft a number of turns in the first direction about the central axis in response to determining that a variation between a measured profile of the particulate material and a target profile of the particulate material exceeds a threshold value.

12. The particulate material leveling system of claim 8, wherein at least one wrapped wire of the plurality of wrapped wires has a round cross-section.

13. The particulate material leveling system of claim 8, wherein the agitating system comprises a plurality of agitating members coupled to the shaft and disposed axially between at least two of the plurality of wrapped wires.

14. The particulate material leveling system of claim 8, comprising a plurality of mounting members configured to couple the plurality of wrapped wires to the shaft, wherein the plurality of mounting members are formed at respective ends of the plurality of wrapping wires.

15. A particulate material leveling system of an agricultural system, the particulate material leveling system comprising:
  an agitating system configured to be disposed within a storage tank for a particulate material and upstream of multiple meter rollers, each meter roller configured to meter the particulate material to at least one row unit of the agricultural system, wherein the agitating system is configured to direct the particulate material to multiple meter rollers, the agitating system comprising:
    a drive system;
    a shaft coupled to a drive system, and the drive system is configured to cause the shaft to rotate about a central axis;
    a plurality of wrapped wires, wherein the plurality of wrapped wires extend around the shaft along a helical path in an axial direction and a circumferential direction, a first wrapped wire of the plurality of wrapped wires is configured to move the particulate material in a first axial direction along the shaft and in response to rotation of the first wrapped wire in a first rotational direction about the central axis, and a second wrapped wire of the plurality of wrapped wires is configured to move the particulate material in a second axial direction, opposite the first axial direction, along the shaft and in response to rotation of the second wrapped wire in the first rotational direction about the central axis; and a controller communicatively coupled to the drive system, and configured to control the drive system to rotate the shaft to provide an even distribution of the particulate material across all of the multiple meter rollers, wherein the agitating system is positioned in the agricultural system such that rotational movement of the plurality of wrapped wires directs the particulate material into one or more of the multiple meter rollers.

16. The particulate material leveling system of claim 15, wherein the drive system is configured to be manually operated.

17. The particulate material leveling system of claim 15, wherein the drive system comprises an electric motor.

18. The particulate material leveling system of claim 17, wherein the controller is configured to control the electric motor to rotate the shaft a number of turns in the first rotational direction about the central axis in response to determining that a variation between a measured profile of the particulate material and a target profile of the particulate material exceeds a threshold value.

19. The particulate material leveling system of claim 15, wherein at least one wrapped wire of the plurality of wrapped wires has a non-round cross-section.

20. The particulate material leveling system of claim 15, wherein the agitating system comprises a plurality of agitating members coupled to the shaft and disposed axially between at least two of the plurality of wrapped wires.

* * * * *